292-113 S9
7/2/85 US RE 31,935

United States Patent [19]

Poe

[11] E Patent Number: Re. 31,935

[45] Reissued Date of Patent: Jul. 2, 1985

[54] EXTERNALLY ACCESSIBLE ADJUSTER FOR FLUSH LATCHES

[75] Inventor: L. Richard Poe, Long Beach, Calif.

[73] Assignee: Hartwell Corporation, Placentia, Calif.

[21] Appl. No.: 194,145

[22] Filed: Oct. 6, 1980

Related U.S. Patent Documents

Reissue of:

[64] Patent No.: 4,183,564
Issued: Jan. 15, 1980
Appl. No.: 882,173
Filed: Mar. 1, 1978

[51] Int. Cl.[3] ..... E05C 5/00; E05C 19/12

[52] U.S. Cl. ..... 292/113; 292/247; 292/DIG. 31; 292/DIG. 60

[58] Field of Search ..... 292/113, 341.18, 158, 292/139, 341.9, 340, DIG. 31; 74/424.8 R

[56] References Cited

U.S. PATENT DOCUMENTS

| | | | |
|---|---|---|---|
| 230,794 | 8/1880 | Lyon et al. | 292/DIG. 29 |
| 292,513 | 1/1884 | Shailer | 411/138 |
| 653,055 | 7/1900 | Baker | 254/235 X |
| 705,634 | 7/1902 | Bates | 254/235 |
| 1,119,321 | 12/1914 | Schmidgall | 292/341.18 |
| 1,250,574 | 12/1917 | Ferris | 292/113 |
| 2,089,163 | 8/1937 | Hansen | 292/341.18 |
| 2,319,063 | 5/1943 | Hutchinson | 74/424.8 R |
| 2,498,221 | 2/1950 | Poupitch | 411/134 |
| 2,710,214 | 6/1955 | Summers | 292/113 X |
| 2,712,955 | 7/1955 | Andrews | 292/113 |
| 2,732,238 | 1/1956 | Dornberg | 292/341.18 X |
| 2,904,141 | 9/1959 | Henrichs | 292/341.18 X |
| 3,166,297 | 1/1965 | Colmer | 254/236 |
| 3,212,746 | 10/1965 | Wright | 254/236 |
| 3,428,348 | 2/1969 | Swanson | 292/113 |
| 3,664,696 | 5/1972 | Poe | 292/DIG. 31 X |
| 4,025,096 | 5/1977 | Geer | 292/341.18 X |
| 4,040,326 | 8/1977 | Breed | 411/438 X |
| 4,158,463 | 6/1979 | Henrichs | 292/341.18 |
| 4,220,364 | 9/1980 | Poe | 292/113 X |

FOREIGN PATENT DOCUMENTS

| | | | |
|---|---|---|---|
| 2330387 | 1/1974 | Fed. Rep. of Germany | |
| 981093 | 5/1951 | France | 292/DIG. 31 |
| 461014 | 12/1949 | Italy | 292/341.18 |
| 633301 | 12/1949 | United Kingdom | |
| 854885 | 11/1960 | United Kingdom | 248/475 B |

*Primary Examiner*—J. Franklin Foss
*Attorney, Agent, or Firm*—Lyon & Lyon

[57] ABSTRACT

An externally accessible adjuster, particularly suited for adjusting the tension of a keeper shaft as applied to a hook type latch forming a part of a flush type latch assembly, the keeper shaft being screwthreaded and receiving a screwthreaded wheel having a set of radiating slots exposed in sequence through an access opening formed in the wall of the structure utilizing the flush type latch assembly. Two embodiments are illustrated, either one of which may use an opening which may be arranged to receive the latch handle, or a separate opening; also, either adjuster may be arranged to utilize a helically coiled frictional element or a yieldable detent.

36 Claims, 7 Drawing Figures

EXTERNALLY ACCESSIBLE ADJUSTER FOR FLUSH LATCHES

Matter enclosed in heavy brackets [ ] appears in the original patent but forms no part of this reissue specification; matter printed in italics indicates the additions made by reissue.

BACKGROUND

Flush type latch assemblies are used extensively on aircraft for receiving flush mounted hinged or removable panels. Such panels are subject to substantial, even excessive, stress and care must be taken that each latch assembly is properly adjusted to take its share of the load. Usually adjustment has required unfastening the latch assembly, making an adjustment, then relatching the assembly, a time consuming and not always dependable procedure. Special latch assemblies have been developed wherein the latch arm is externally accessible for adjustment.

SUMMARY

The present invention is directed to an externally accessible adjuster for the latch keeper rather than the latch itself, and is summarized in the following objects.

First, to provide a latch keeper adjuster which is externally accessible and may be adapted for use with a variety of standard latch assemblies.

Second, to provide a latch keeper adjuster, as indicated in the preceding object, which is capable of being installed as a replacement for a conventional keeper, the latch assembly requiring little if any alteration.

Third, to provide a latch keeper adjuster wherein the keeper shaft is screwthreaded and a screwthreaded wheel having radial tool receiving slots is fitted thereon and axially restrained by a fixed housing, the slots being accessible through a small access opening provided in the adjacent structure.

Fourth, to provide a flush latch keeper adjuster, an embodiment of which may be sufficiently compact that an adjustment tool may be inserted through the latch handle opening when the latch handle is in its initial open position while the latch hook is still in engagement with the keeper.

BRIEF DESCRIPTION OF THE FIGURES

FIGS. 1 through 4 are directed to a first embodiment in which:

FIG. 1 is a side view of a conventional flush type latch set in a surrounding surface, the latch lever of the latch structure shown attached to the externally accessible adjuster constituting the present invention.

FIG. 2 is an enlarged sectional view thereof taken through 2—2 of FIG. 1 with adjacent portions of the aircraft structure shown fragmentarily.

FIG. 3 is an enlarged sectional view taken through 3—3 of FIG. 2, the surrounding structure being omitted.

FIG. 4 is a bottom view taken from 4—4 of FIG. 3.

FIGS. 5 through 7 are directed to a second embodiment, in which:

FIG. 5 is an enlarged fragmentary sectional view taken through 5—5 of FIG. 6.

FIG. 6 is an enlarged fragmentary sectional view taken through 6—6 of FIG. 5.

FIG. 7 is an enlarged end view with a portion of the supporting means shown fragmentarily and in section.

DETAILED DESCRIPTION

Figure 1:
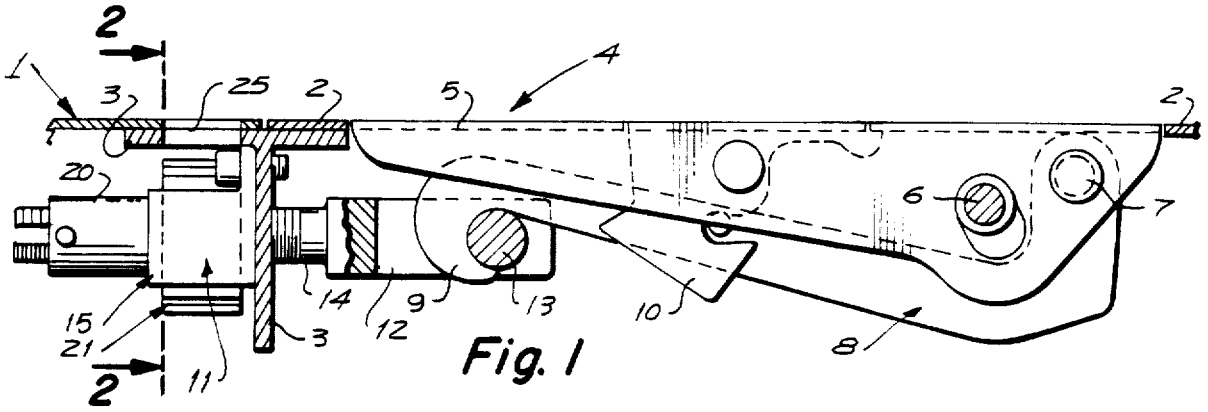
Figure 2:
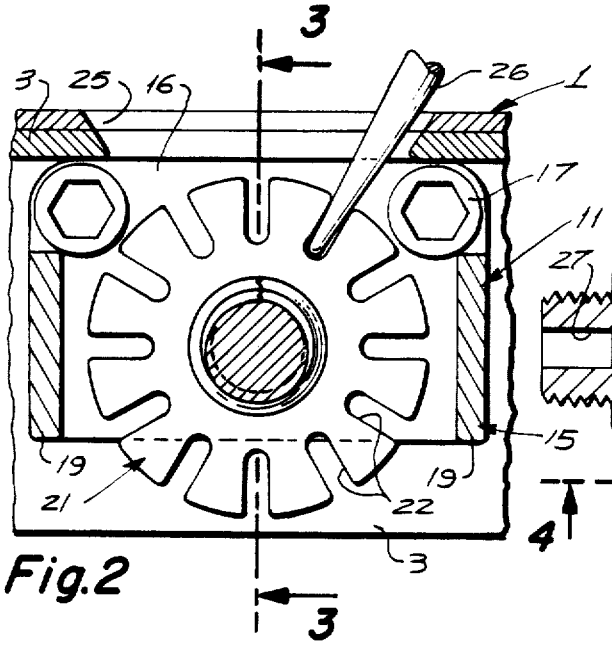
Figure 3:
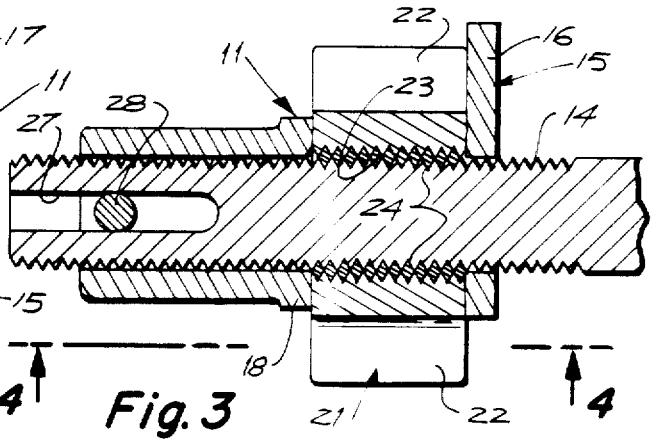
Figure 4:
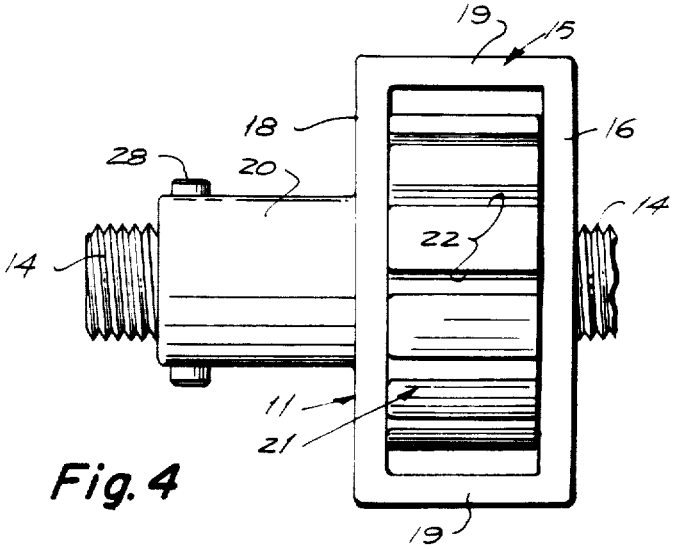

The externally accessible adjuster for flush latches is particularly adapted for use on aircraft represented fragmentarily by surface structure 1 in which is set a panel 2 supported in a surrounding frame 3.

The externally accessible adjuster may be adapted for use with a variety of latch assemblies. The latch assembly herein illustrated is essentially that shown in U.S. Pat. No. 2,712,955. However, a wide variety of flush type hook latches may be used; for example, but not limited to, the flush type latches shown in U.S. Pat. Nos. 2,894,777; 2,904,141; 3,318,624; 3,503,642; 3,515,422 and 3,542,410.

The selected latch assembly designated 4 includes a handle 5 adapted to occupy a flush position in the panel 2. The handle is pivoted about a journal pin 6 so that it may be moved between a flushed closed position and an angular position for manual engagement. Connected to the handle 5 by a journal pin 7 as a latch arm 8 having a hook end 9. When in the flush position, the handle 5 and latch arm 8 are joined together by a flush type linking latch 10 carried by the handle 5 and adapted to secure the handle and the latch arm 8 when the latch assembly is in its closed position shown in FIG. 1. The linking latch 10 is manually engagable for releasing the handle.

One embodiment of the adjuster for flush latches is shown in FIGS. 1 through 4 and includes an adjuster assembly 11 having a keeper 12 which is U-shaped and provided with a cross pin 13 positioned for engagement with the hook end 9 of the latch arm 8. Extending from the keeper 12 is a screwthreaded shaft 14 which extends through the adjacent portion of the frame 3.

Mounted on the frame 3 is a housing 15 in the form of a rectangular frame and including a base 16 secured by screws 17 to the frame 3. Spaced from the base plate 16 is a parallel plate 18 which is joined to the base plate 16 by end walls 19. Extending from the plate 18 is a sleeve 20. The shaft 14 extends between the plate 16 and 18 and through the sleeve 20.

Received between the base plate 16 and parallel plate 18 is a tension adjustment wheel 21 having radial slots 22. The wheel 21 is provided with a screwthreaded bore 23 which does not directly engage the screwthreaded shaft 14 but instead a helical wire coil 24 is interposed which coil provides a predetermined degree of friction between the wheel and the shaft.

The coil 24 may be the type known commercially as "Heli Coil". It should be noted, however, that other conventional friction *or restraining* means may be provided between the wheel and shaft or between the wheel and the housing.

It will be noted in FIG. 1 that the wheel is in close proximity to the surface of the aircraft structure and is made externally accessible by a small aperture 25 through which a screwdriver 26 or other similar tool may be inserted to engage the radial slots 22. Sequential engagement of the slots may rotate the wheel in either direction so as to advance or retract the shaft 14. In order to prevent rotation of the shaft, the shaft is provided with an axial slot 27 which receives a cross pin 28 anchored in the sleeve 20.

Figure 5:
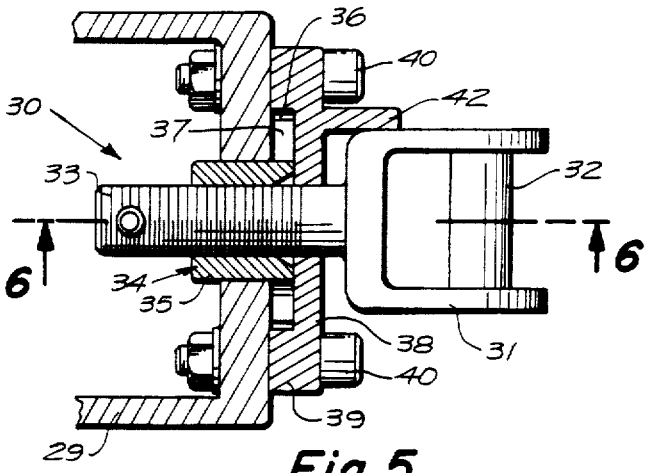
Figure 7:
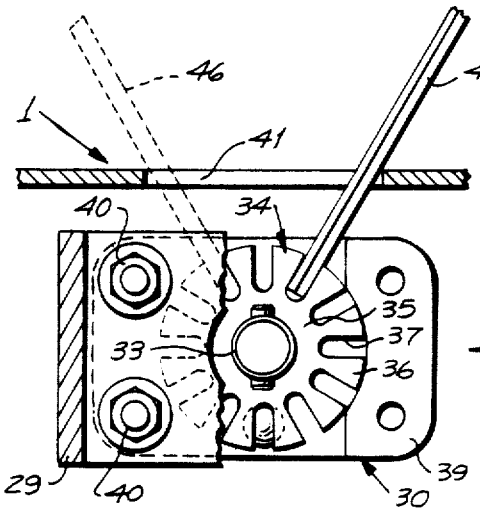
Figure 6:
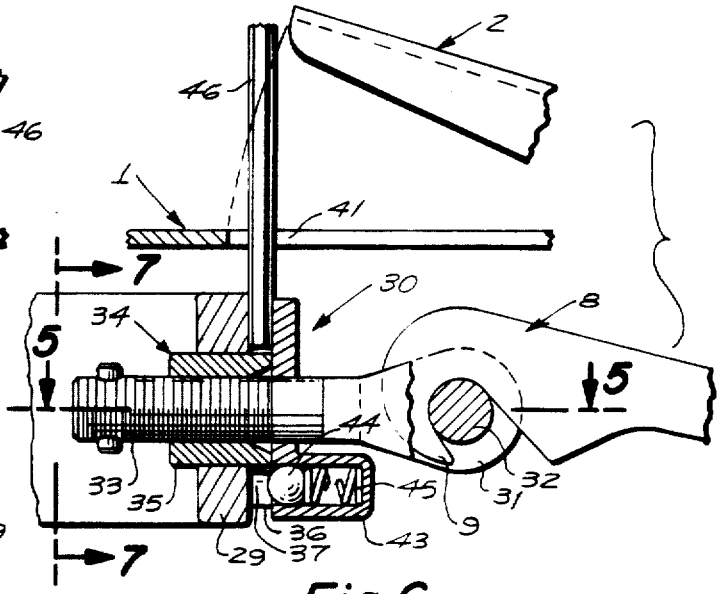

The second embodiment of the adjuster for flush latches is shown in FIGS. 5 through 7 and utilizes the surface structure 1 and handle [2] *5* previously described; however, a conventional frame member 29 is utilized in place of the surrounding frame 3. This embodiment of the adjuster for flush latches utilizes the latch assembly 4 and the components thereof as previously described.

The adjuster includes an adjuster assembly 30 having a U-shaped keeper 31 provided with a cross pin 32 and a screwthreaded shaft 33 similar except for proportions to the first described keeper.

The shaft 33 receives a tension adjustment wheel 34 having an internally screwthreaded sleeve 35 having a flanged end 36 provided with radial slots 37, and in this respect is similar to the sleeve 20 and tension adjustment wheel 21. A base plate 38 is received on the shaft 33 adjacent to the keeper 12. The base plate 38 includes laterally spaced raised portions 39 between which is positioned the flanged end 36 of the tension adjustment wheel 34.

The raised portions 39 engage the frame member 29 so that the flanged end 36 is freely rotatable but is axially restrained with respect to the base plate 38. Screws 40 secure the base plate to the frame member. The flanged end 36 is positioned in a plane disposed adjacent an end of the panel opening 41 which receives the handle 5. To prevent rotation of the shaft 33 and keeper 31, the base plate 38 is provided with an extension 42. The base plate is provided with an axially extending detent socket 43 which receives a detent ball 44 backed by a spring 45 and positioned to engage the radial slots 37.

Operation of the embodiment of the adjuster for flush latches shown in FIGS. 5, 6 and 7 is as follows.

The standard type of flush latch is so arranged that the handle 5 is capable of limited rotational movement without altering the connection between the latch arm 8 and the keeper cross pin 32. This is accomplished by releasing the linking latch 10. As shown in FIG. 6, this initial angular movement of the handle 5 pivots it away from the end of the opening. The flanged end 36 of the adjustment wheel 34 is so positioned as to be readily accessible so that a turning tool may be inserted adjacent the end of the opening 41. The turning tool may be a conventional Allen wrench 46. Arcuate motion of the turning tool may be accomplished as indicated in FIG. 7. Such movement advances or retracts the shaft 33. In use, the tension adjustment wheel 34 is not subject to rotational force; therefore, the ball detent 44 secures the adjustment which is made in increments of the spacing between the radial slots 37, *and restrain rotational movement of the tension adjustment wheel 21.* To prevent excess movement of the shaft 33, a cross pin stop 47 may be provided.

Having fully described my invention, it is to be understood that I am not to be limited to the details herein set forth, but that my invention is of the full scope of the appended claims.

I claim:

[1. The combination with a flush type latch structure mounted in a panel set flush in a surrounding surface structure, an underlying mounting means, and an access opening adjacent the mounting means, the latch structure including a handle member movable in a clearance opening between a flush position and an angular position with respect to the panel, and a latch arm, of an adjustable keeper assembly, comprising:

a. a keeper element removably attached to the latch arm;

b. a screwthreaded shaft extending from the keeper element;

c. a guide means receiving the shaft and secured to the mounting means;

d. a wheel screwthreaded on the shaft and axially restrained by the guide means, the wheel having a ring of radially extending slots accessible in sequence through the access opening by a turning tool, whereby the wheel may be turned to advance or retract the keeper and latch arm while interengaged, said wheel having internal screwthreads spaced from the screwthreads of said shaft; and e. frictional means for advancing or retracting the keeper and latch arm by rotating said wheel, said frictional means being positioned between said wheel and said internal shaft screwthreads.]

[2. A keeper assembly, as defined in claim 1, wherein:

a. the ring of slots are disposed under the extended end of the handle member, and utilize as the access opening the corresponding end of the handle member clearance opening.]

[3. A keeper assembly, as defined in claim 1, wherein:

a. means is provided to restrain the shaft and wheel against relative movement when the wheel is disengaged.]

[4. The keeper assembly claimed in claim 1 wherein said frictional means is further defined as a helical coil.]

[5. The combination with a flush type latch structure mounted in a panel set flush in a surrounding surface structure, an underlying mounting means, and an access opening adjacent the mounting means, the latch structure including a handle member movable in a clearance opening between a flush position and an angular position with respect to the panel, and a latch arm, of an adjustable keeper assembly, comprising:

a. a keeper element removably attached to the latch arm;

b. a screwthreaded shaft extending from the keeper element;

c. a guide means receiving the shaft and secured to the mounting means;

d. a wheel screwthreaded on the shaft and axially restrained by the guide means, the wheel having a ring of radially extending slots accessible in sequence through the access opening by a turning tool, whereby the wheel may be turned to advance or retract the keeper and latch arm while interengaged, said wheel having internal screwthreads spaced from the screwthreads of said shaft; and e. helical coil frictional means for advancing or retracting the keeper and latch arm by rotating said wheel, said frictional means being positioned between said wheel and said internal shaft screwthreads.]

*6. An adjustable latching apparatus adapted for mounting on an aircraft or the like to secure a first aircraft member relative to a second aircraft member, comprising:*

*a latch assembly connected to said first aircraft member and an adjuster assembly connected to said second aircraft member;*

*said adjuster assembly including a tension adjustment wheel and a keeper;*

*said latch assembly including a latch arm engageable with said keeper and during engagement therewith operably connecting said keeper with said first aircraft member;*

*said tension adjustment wheel being adapted to receive said keeper and cause relative axial movement of said*

*keeper with respect to said adjustment wheel and said aircraft members when said aircraft members are fixably positioned relative to one another and without axial movement of said tension adjustment wheel with respect to said aircraft members and thereby adjust the load substantially equally between said keeper and said latch arm and said aircraft members during axial movement of said keeper when said latch arm and said keeper are in engagement; and*

*frictional means restraining means being adapted to engage said tension adjustment wheel and thereby retard rotational movement thereof after adjustment of the load.*

*7. The apparatus of claim 6 wherein a screwthreaded bore on said tension adjustment wheel engages a screwthreaded shaft on said keeper.*

*8. The apparatus of claim 7 wherein said screwthreaded shaft is threaded in a single direction.*

*9. The apparatus of claim 6 wherein said restraining means comprises a ball detent biased against said tension adjustment wheel.*

*10. The apparatus of claim 6 wherein said restraining means is positioned between said screwthreaded bore and said screwthreaded shaft.*

*11. The apparatus of claim 10 wherein said restraining means is further defined as a helical coil.*

*12. The apparatus of claim 6 wherein means are provided to prevent rotation of said keeper during axial movement thereof.*

*13. The apparatus of claim 12 wherein said means to prevent rotation of said keeper comprises a pin member which is secured to said guide means and which engages a slot in said keeper.*

*14. In an aircraft adjustable latching apparatus for securing a member of an aircraft having a latch assembly and a tension adjuster for adjusting the load to be applied to said latch assembly, the combination comprising:*

*a latch arm operable connected to a first member of the aircraft;*

*mounting means to connect said tension adjuster to a second member of the aircraft;*

*said tension adjuster including a rotatable tension adjustment wheel and a keeper element removably engaging said latch arm, said keeper element including a screwthreaded shaft extending therefrom;*

*guide means secured to said mounting means, said tension adjustment wheel being axially restrained by said guide means during rotational movement of said tension adjustment wheel;*

*said tension adjustment wheel having a screwthreaded bore through which said screwthreaded shaft extends and which is operably connected therewith to cause relative axial movement of said keeper element with respect to said tension adjustment wheel during rotational movement of said tension adjustment wheel whereby said tension adjustment wheel may be rotated to axially advance or retract said keeper element while engaging said latch arm and thereby adjust substantially equally the tension in said keeper element and said latch arm and thus said latch assembly when said first aircraft member is fixably positioned with respect to said second aircraft member; and*

*restraining means operably engaging said tension adjustment wheel to secure the adjustment and prevent inadvertent axial movement of said keeper element by retarding rotational movement of said tension adjustment wheel.*

*15. The apparatus of claim 14, wherein said latch arm provides the single operable connection between said keeper element and said first aircraft member.*

*16. The apparatus of claim 15, wherein said tension adjustment wheel includes a plurality of radially extending slots adapted to receive a tool for rotating said tension adjustment wheel.*

*17. The apparatus of claim 16, wherein said screwthreaded bore engages said screwthreaded shaft and said restraining means comprises a ball detent biased against said tension adjustment wheel.*

*18. The apparatus of claim 16, wherein said restraining means comprises a helical coil positioned between said screwthreaded bore and said screwthreaded shaft.*

*19. In an aircraft adjustable latching apparatus with a latch assembly set flush in the surrounding surface of an aircraft panel and having an underlying mounting means with an external access opening adjacent the mounting means, the combination comprising:*

*a tension adjuster for adjusting the tension in the latch assembly, including a rotatable tension adjustment wheel and a keeper element having a screwthreaded shaft extending therefrom;*

*a latch arm engageable with said keeper element and a pivotally connected handle member movable when said latch arm engages said keeper element in a clearance opening in said panel between a flush position closing said external access opening and an angular position with respect to the panel;*

*guide means secured to said mounting means, said tension adjustment wheel being axially restrained by said guide means during rotational movement of said tension adjustment wheel;*

*said tension adjustment wheel positioned adjacent said external access opening for access thereto through said external access opening when said handle member is in the angular position;*

*said tension adjustment wheel having a screwthreaded bore through which said screwthreaded shaft extends and which is operably connected therewith to cause relative axial movement of said keeper element with respect to said tension adjustment wheel during rotational movement of said tension adjustment wheel whereby when said keeper element and said latch arm are engaged said tension adjustment wheel may be rotated to advance or retract said keeper element and thereby adjust substantially equally the tension in said keeper element and said latch assembly; and*

*restraining means operably engaging said tension adjustment wheel to secure the adjustment and prevent inadvertent axial movement of said keeper element by retarding rotational movement of said tension adjustment wheel.*

*20. The apparatus of claim 19, wherein said tension adjustment wheel includes means adapted to receive a tool through said external access opening to rotate said tension adjustment wheel.*

*21. The apparatus of claim 20, wherein the means comprises a ring of radially extending slots accessible in sequence through said external access opening.*

*22. The apparatus of claim 19, wherein said keeper element is adapted to be removably engaged to said latch arm below the surrounding surface.*

*23. An adjustable latching apparatus for mounting on an aircraft or the like to secure a first aircraft member relative to a second aircraft member with at least one of said aircraft members having an exterior panel surface which includes an external access opening, comprising:*

*a latch assembly connected to said first aircraft member;*

*an adjuster assembly for adjusting a load in said latch assembly and having a rotatable adjustment wheel and a keeper element including a screwthreaded shaft extending therefrom;*

*underlying means to connect said adjuster assembly to said second aircraft member and position said adjustment wheel adjacent said external access opening for access to said adjustment wheel;*

*said latch assembly including a latch arm engageable with said keeper element and during engagement therewith operably connecting said keeper element with said first aircraft member;*

*housing means for said adjustment wheel adapted to axially restrain said adjustment wheel during rotational movement thereof;*

*said adjustment wheel having a screwthreaded bore through which said screwthreaded shaft extends and which is operably connected therewith to cause relative axial movement of said keeper element with respect to said adjustment wheel during rotational movement of said adjustment wheel whereby said adjustment wheel may be rotated to axially advance or retract said keeper element while engaging said latch arm and thereby adjust the load substantially equally between said latch assembly, said keeper and said aircraft members when said aircraft members are fixably positioned relative to one another;*

*said adjustment wheel having a radially extending portion with a ring of radially extending slots therein accessible in sequence through said external access opening and adapted to receive a tool through said external access opening to rotate said adjustment wheel; and*

*restraining means operably engaging said adjustment wheel and being adapted to permit rotational movement of said adjustment wheel when acted on by said tool during adjustment of the load and to automatically retard rotational movement of said adjustment wheel after adjustment of the load.*

*24. The apparatus of claim 23, wherein said radially extending slots include an open end proximate the circumference of said adjustment wheel adapted to receive said tool and said adjustment wheel is adapted to locate one or more of said open ends immediately opposite said external access opening during any rotational position of said adjustment wheel.*

*25. The apparatus of claim 24, wherein the diameter of said adjustment wheel may exceed the width of said external access opening.*

*26. The apparatus of claim 23, wherein said adjuster assembly is adapted to be operated by a single tool and to cause adjustment with a single operation of said tool.*

*27. The apparatus of claim 26, wherein said adjuster assembly is adapted to be operated by an Allen wrench.*

*28. The apparatus of claim 23, wherein said latch assembly is adapted when closed to be set flush with the surrounding exterior surface of said panel and includes a pivotally connected handle member movable when said latch arm engages said keeper element in a clearance opening in said panel between a flush position closing said external access opening and an angular position with respect to the panel.*

*29. The apparatus of claim 23, wherein said restraining means remains biased against said adjustment wheel during rotational movement thereof.*

*30. The apparatus of claim 23, wherein said housing means includes at least one plate adjacent said adjustment wheel and adapted to abut one of said aircraft members and thereby provide structural support to said adjuster assembly.*

*31. The apparatus of claim 30, wherein said housing means includes a pair of parallel plates, one on each side of said radially extending portion of said adjustment wheel.*

*32. The apparatus of claim 23, wherein said adjustment wheel includes an axially extending sleeve which defines said screwthreaded bore and which receives and supports said screwthreaded shaft of said keeper element.*

*33. The apparatus of claim 23, wherein said adjustment wheel is positioned below said exterior panel surface.*

*34. In an aircraft adjustable latching apparatus having a latch assembly with a latch arm and adapted to secure a first aircraft member relative to a second aircraft member with at least one of said aircraft members having an exterior panel which includes an external access opening, an adjuster assembly for adjusting a load in the latch assembly, comprising:*

*a rotatable adjustment wheel and a keeper element engageable with the latch arm to secure the first and second aircraft members including a screwthreaded shaft extending therefrom;*

*means for mounting said adjuster assembly for connecting with said second aircraft member and to position said adjustment wheel beneath the exterior panel surface and adjacent said external access opening for access to said adjustment wheel;*

*said adjustment wheel having a radially extending portion with a ring of radially extending slots therein accessible in sequence through said external access opening and adapted to receive a tool through said external access opening to rotate said adjustment wheel;*

*housing means for said adjustment wheel adapted to axially restrain said adjustment wheel during rotational movement thereof, said housing means including at least one plate member adjacent a side of said radially extending portion of said adjustment wheel;*

*a screwthreaded bore in said adjustment wheel through which said screwthreaded shaft extends and which is operably connected therewith to cause relative axial movement of said keeper element with respect to said adjustment wheel whereby the adjustment wheel may be rotated to axially advance or retract in substantially infinite increments said keeper element while engaging the latch arm and adjust the load substantially equally in said keeper element and the latch assembly; and*

*restraining means operably engaging said adjustment wheel and thereby retard rotational movement thereof after adjustment of the load.*

*35. In an aircraft adjustable latching apparatus for securing a member of an aircraft having a latch assembly and a tension adjuster for adjusting the load to be applied to said latch assembly, the combination comprising:*

*a latch arm operably connected to a first member of the aircraft;*

*mounting means to connect said tension adjuster to a second member of the aircraft;*

*said tension adjuster including a rotatable tension adjustment wheel and a keeper element removably engaging said latch arm, said keeper element including a screwthreaded shaft extending therefrom;*

*guide means secured to said mounting means, said tension adjustment wheel being axially restrained by said guide means during rotational movement of said tension adjustment wheel;*

*said tension adjustment wheel having a screwthreaded bore through which said screwthreaded shaft extends and which is operably connected therewith to cause relative axial movement of said keeper element with respect to said tension adjustment wheel during rotational movement of said tension adjustment wheel whereby said tension adjustment wheel may be rotated to axially advance or retract said keeper element while engaging said latch arm and thereby adjust substantialy equally the tension in said keeper element and said latch arm and thus said latch assembly when said first aircraft member is fixably positioned with respect to said second aircraft member; and*

*frictional means positioned between said screwthreaded bore and said screwthreaded shaft and thereby operably connecting said bore and said shaft, said frictional means being adapted to prevent inadvertent axial movement of said keeper element by restraining rotational movement of said tension adjustment wheel.*

*36. In an aircraft adjustable latching apparatus for securing a member of an aircraft having a latch assembly and a tension adjuster for adjusting the load to be applied to said latch assembly, the combination comprising:*

*a latch arm operably connected to a first member of the aircraft;*

*mounting means to connect said tension adjuster to a second member of the aircraft;*

*said tension adjuster including a rotatable tension adjustment wheel and a keeper element removably engaging said latch arm, said keeper element including a screwthreaded shaft extending therefrom;*

*guide means secured to said mounting means, said tension adjustment wheel being axially restrained by said guide means during rotational movement of said tension adjustment wheel;*

*said tension adjustment wheel having a screwthreaded bore through which said screwthreaded shaft extends and which is operably connected therewith to cause relative axial movement of said keeper element with respect to said tension adjustment wheel during rotational movement of said tension adjustment whereby said tension adjustment wheel may be rotated to axially advance or retract said keeper element while engaging said latch arm and thereby adjust substantially equally the tension in said keeper element and said latch arm and thus said latch assembly when said first aircraft member is fixably positioned with respect to said second aircraft member; and*

*yieldable detent means biased against said tension adjustment wheel, said yieldable detent means being adapted to prevent inadvertent axial movement of said keeper element by restraining rotational movement of said tension adjustment wheel.*

* * * * *

UNITED STATES PATENT AND TRADEMARK OFFICE

CERTIFICATE OF CORRECTION

PATENT NO. : RE 31,935

DATED : July 2, 1985

INVENTOR(S) : L. Richard Poe

It is certified that error appears in the above-identified patent and that said Letters Patent is hereby corrected as shown below:

In Column 5, Line 10, please delete the words "frictional means". The line should now read "restraining means being adapted to".

Column 9, Line 9-10, please delete the word "substantialy" which was inadvertently misspelled, and insert therefore the correct spelling of the word "substantially".

Signed and Sealed this

Eighth Day of September, 1987

*Attest:*

DONALD J. QUIGG

*Attesting Officer*

*Commissioner of Patents and Trademarks*